United States Patent
Roach

(10) Patent No.: US 9,475,567 B1
(45) Date of Patent: Oct. 25, 2016

(54) DOUBLE-LAYERED BALLOON ENVELOPE

(71) Applicant: Google Inc., Mountain View, CA (US)

(72) Inventor: Kevin Roach, Mountain View, CA (US)

(73) Assignee: Google Inc., Mountain View, CA (US)

( * ) Notice: Subject to any disclaimer, the term of this patent is extended or adjusted under 35 U.S.C. 154(b) by 257 days.

(21) Appl. No.: 13/916,225

(22) Filed: Jun. 12, 2013

(51) Int. Cl.
*B64B 1/58* (2006.01)
*B64B 1/40* (2006.01)

(52) U.S. Cl.
CPC . *B64B 1/58* (2013.01); *B64B 1/40* (2013.01); *Y10T 428/1379* (2015.01); *Y10T 428/1383* (2015.01)

(58) Field of Classification Search
CPC ............. B64B 1/40; B64B 1/42; B64B 1/44; B64B 1/46; B64B 1/48; Y10T 428/1379; Y10T 428/1383
USPC ................................................ 428/36.6, 36.7
See application file for complete search history.

(56) References Cited

U.S. PATENT DOCUMENTS

| | | | | |
|---|---|---|---|---|
| 4,174,082 A | * | 11/1979 | Eshoo | B64B 1/58 244/31 |
| 4,390,149 A | | 6/1983 | Barnes et al. | |
| 4,420,130 A | * | 12/1983 | Regipa | B64B 1/58 244/126 |
| 4,877,205 A | | 10/1989 | Rand | |
| 4,999,236 A | * | 3/1991 | McCullough, Jr. | B32B 27/12 244/126 |
| 5,076,513 A | * | 12/1991 | Regipa | B64B 1/40 244/128 |
| 5,104,059 A | | 4/1992 | Rand et al. | |
| 5,184,190 A | * | 2/1993 | Rai | G01N 21/8901 250/559.12 |
| 5,857,645 A | * | 1/1999 | Hodgson | 244/33 |
| 5,942,320 A | * | 8/1999 | Miyake et al. | 428/216 |
| 5,992,795 A | | 11/1999 | Tockert | |
| 6,290,172 B1 | | 9/2001 | Yajima et al. | |
| 6,685,136 B2 | | 2/2004 | Yajima et al. | |
| 9,193,480 B2 | * | 11/2015 | Smith | B64B 1/44 |
| 2010/0239797 A1 | * | 9/2010 | Alavi | B32B 5/02 428/35.3 |

\* cited by examiner

*Primary Examiner* — Walter B Aughenbaugh
(74) *Attorney, Agent, or Firm* — McDonnell Boehnen Hulbert & Berghoff LLP

(57) ABSTRACT

A balloon envelope, having a base layer of ethylene vinyl alcohol (EVOH) and a layer of a second material, that is not EVOH, bonded to at least a portion of an outer-facing surface of the EVOH layer, is provided. The second material may be polyethylene, or a biaxially-oriented polyethylene terephthalate, such as Mylar®. The envelope may also be provided with another layer of the second material bonded to at least a portion of an inner-facing surface of the EVOH layer. The combination of the EVOH layer and the layer of the second material may be less gas-permeable than the EVOH layer alone and the layer of the second material alone.

17 Claims, 6 Drawing Sheets

DOUBLE-LAYERED BALLOON ENVELOPE

BACKGROUND

Unless otherwise indicated herein, the materials described in this section are not prior art to the claims in this application and are not admitted to be prior art by inclusion in this section.

Balloons that are capable of reaching high-altitudes and being positioned in the stratosphere are increasingly being used across areas of the world. The conditions in the stratosphere, such as high altitude and increased pressure, expose the high-altitude balloons to difficult conditions, thus challenging the balloon's construction and durability. Therefore, for these and other reasons, the balloons may be built with particular materials to increase the balloon's ability to reach high altitudes and remain stable in the stratosphere. Accordingly, an envelope for a high-altitude balloon that has suitable gas-barrier properties, flexibility and strength is desirable.

SUMMARY

In one aspect, an example balloon envelope may include: (i) a layer of ethylene vinyl alcohol (EVOH); and (ii) a layer of a second material bonded to at least a portion of an outer-facing surface of the EVOH layer, wherein the second material is not EVOH.

In another aspect, an example balloon envelope may include a layer of ethylene vinyl alcohol (EVOH) having an outer-facing surface and an inner-facing surface, the inner-facing surface of the EVOH layer being bonded to a first layer of polyethylene and the outer-facing surface of the EVOH layer being bonded to a second layer of polyethylene.

These as well as other aspects, advantages, and alternatives, will become apparent to those of ordinary skill in the art by reading the following detailed description, with reference where appropriate to the accompanying drawings.

DETAILED DESCRIPTION

Figure 1:
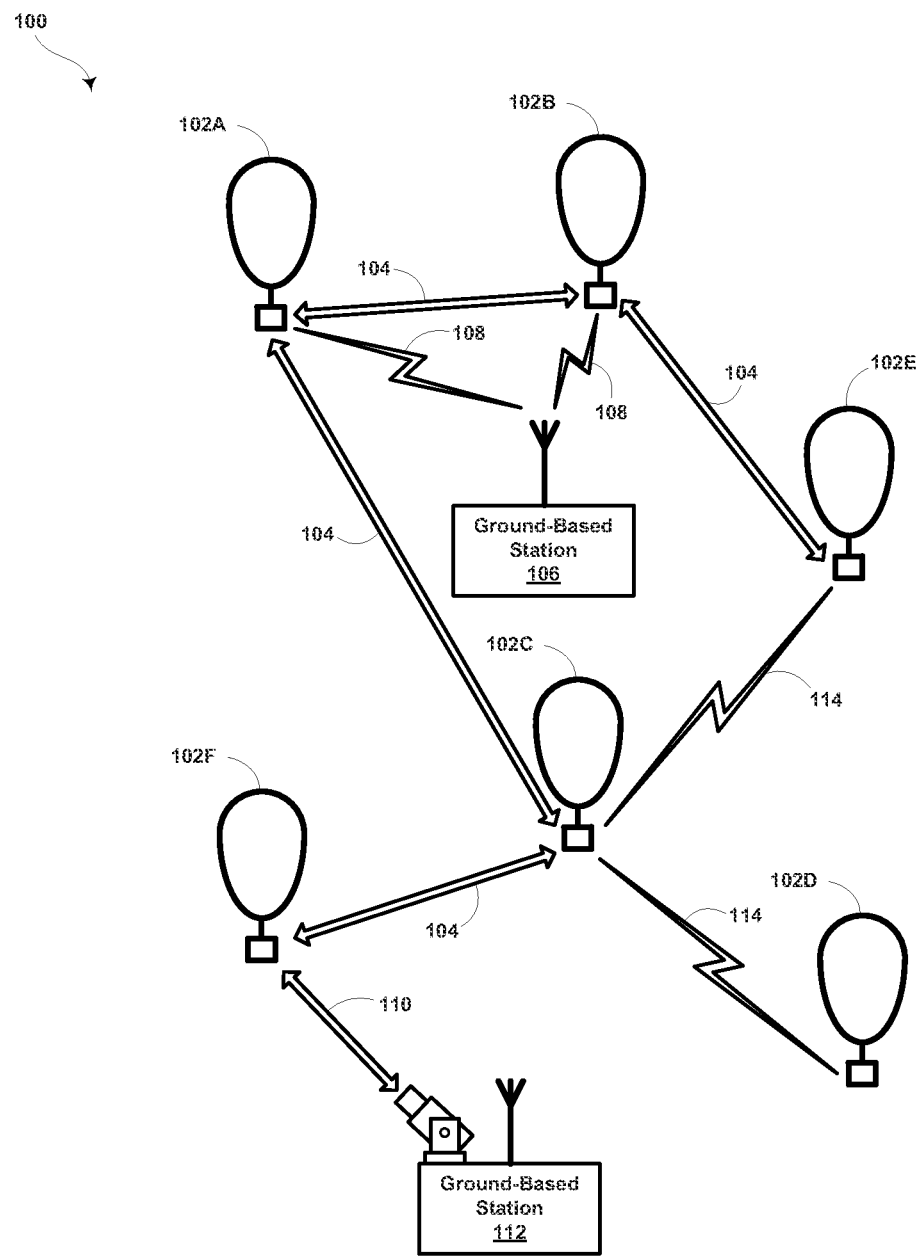
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures or otherwise described herein should not be viewed as necessarily limiting. It should be understood that other embodiments may include more or less of each element shown in a given Figure. Further, some of the illustrated elements may be combined or omitted. Yet further, an example embodiment may include elements that are not illustrated in the Figures.

1. Overview

The balloon envelope described herein may help provide for more durable, yet lightweight constructions for the manufacture of a balloon having desirable gas-barrier properties that is capable of reaching high-altitudes.

Traditionally, envelopes of high-altitude balloons are made from materials such as nylon or polyester, and are filled with helium or hydrogen. Due to cost and weight considerations, these balloons are typically formed from a single layer of material. In order to maximize flight success, materials used to construct the balloon envelopes must have certain gas and moisture barrier properties and must be lightweight, yet strong enough to provide structure. Such a combination is often difficult, specifically for balloons designed to travel into high altitudes, where temperature, light and atmospheric conditions may be extreme.

Further, the properties of the material(s) used to make the balloon envelope are important to the ability to control the altitude and thus latitude/longitude of a balloon in a network. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

In the present disclosed embodiments, the altitude of a balloon may be controlled in a number of different ways. For example, the buoyancy, and thus the altitude, of the balloon may be controlled by adjusting the temperature of the gas within an envelope of the balloon. It should be pointed out that the temperature of the gas within the envelope itself does not change the buoyancy of the balloon. In order for temperature to change buoyancy, the envelope needs to be somewhat elastic so that it expands when heated, or the gas inside is heated, or conversely that it collapses to some degree when cooled, since it is the density change of the gas within the balloon that, by definition, is what changes the buoyancy of the balloon. In any event, under proper circumstances, the altitude of balloon may be controlled by increasing or decreasing the temperature of the gas within the envelope. Such increase or decrease in temperature may be achieved in a variety of manners. For example, during the daylight hours, it may be possible to control the altitude of the balloon by controlling the density of the gas within the balloon, by controlling the amount of solar energy that is absorbed by the gas. At night, when atmospheric temperatures drop, it may be desirable to pump more or less gas into the envelope of the balloon, or into a bladder within the envelope of the balloon, to increase or decrease the buoyancy of the balloon.

One example embodiment of a high-altitude balloon involves a balloon envelope that is constructed of two material layers, one of which is ethylene vinyl alcohol (EVOH). The balloon envelope may utilize co-lamination of an EVOH layer and a layer of another material, to help provide beneficial properties of each material which could not have been achieved using only a single material. For example, the combination of the EVOH layer and the layer of the second material may have better gas-barrier properties than the EVOH layer alone and the second material alone. In a further example, the combination of the EVOH layer and the layer of the second material may have a greater tensile strength than the EVOH layer alone and the layer of the second material alone. In yet a further example, the combination of the EVOH layer and the layer of the second material may be more flexible than the EVOH layer alone and the layer of the second material alone.

EVOH is a formal copolymer of ethylene and vinyl alcohol. The plastic resin is a lightweight material that is commonly used in food packaging applications (i.e., in Heptax), and it has lately found application in plastic gasoline tanks for automobiles. Its primary purpose is to provide barrier properties, primarily as an oxygen barrier for improved food packaging shelf life and as a hydrocarbon barrier for fuel tanks EVOH is typically coextruded or laminated as a thin layer between cardboard, foil, or other plastics. EVOH copolymer is defined by the mole % ethylene content: lower ethylene content grades have higher barrier properties; higher ethylene content grades have lower temperatures for extrusion and are more flexible. Ethylene contents of approximately 35-48 mole % are readily commercially available and have desirable barrier properties and flexibility. EVOH is also more resistant to electromagnetic radiation than many other polymers.

While its light weight and barrier properties may make EVOH a good candidate for balloon envelopes, it may, however, be too weak to provide structure to a balloon on its own. Further, EVOH is hygroscopic, and thus very susceptible to moisture. In particular, the gas barrier properties of EVOH depend on humidity. In contrast, some materials, such as Mylar and polyethylene, may excel at providing structure to a balloon envelope.

Mylar®, a common commercial brand of BoPET—biaxially-oriented polyethylene terephthalate—a stretched polyester film, may be a desirable material due to its gas barrier properties, high tensile strength, chemical and dimensional stability, transparency, reflectivity, and electrical insulation. The orientation of the polymer chains is responsible for the high strength and stiffness of biaxially oriented PET film, which can have a tensile strength exceeding 28,000 psi. Mylar has a density of approximately 1.4 $g/cm^3$. BoPET film, such as Mylar, can be metallized with thin films of evaporated aluminum, gold, or other metals, resulting in increased gas barrier properties and light reflectance and can be co-laminated with other plastics such as Polyvinylidene chloride or amorphous Polyethylene terephthalate for improved sealability.

Polyethylene is a thermoplastic polymer of ethylene used mostly in packaging, agriculture and construction industries. Polyethylene is classified into several different categories based mostly on its density and branching properties. Its mechanical properties depend significantly on variables such as the extent and type of branching, the crystal structure and the molecular weight. Low Density Polyethylene (LDPE) has a density of approximately 0.91-0.94 $g/cm^3$ and low crystallinity (50 to 60%), which makes it more flexible than other classes of polyethylene. The low crystallinity is due to irregular packing due to the main chain being subdivided into side chains with two to four carbon atoms. LDPE may also be obtained with a tensile strength exceeding 3200 psi.

The combination of EVOH with one or both of Mylar and polyethylene may provide a balloon envelope with sufficient structural attributes that also has high gas impermeability (or has other desired gas-barrier properties). Additionally, co-lamination of EVOH and Mylar and/or polyethylene may strengthen the balloon envelope without adding extra mass. In some situations, polyethylene may be chosen over Mylar due to its higher elasticity.

In one embodiment, the balloon envelope may be formed as a "sandwich" with a layer of EVOH having a layer of either Mylar or polyethylene co-laminated on both its inner and outer facing surfaces by a standard co-lamination or co-extrusion process. The co-laminated layers of Mylar or polyethylene may be provided over the entirety of the envelope or only portions of the envelope. The Mylar or polyethylene layer(s) may be between 1-3 mm thick. The EVOH layer is preferably between 0.25 and 0.5 mm thick.

Other additives may also be co-extruded with the EVOH and Mylar or polyethylene layers, including certain UV blockers or IR absorbers, on all or parts of the envelope. Such additives have properties that may be useful in steering of a high-altitude balloon.

It should be understood that the examples discussed above are provided for purposes of example and explanation only and should not be taken to be limiting.

2. Example Balloon Networks

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations may be modelled in a reasonably accurate manner. Additionally, altitudes above 18 km are typically above the maximum flight level designated for commercial air traffic. Therefore, interference with commercial flights is of decreased concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network may also include multiple downlink balloons. On the other hand, a balloon network may also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

a. Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon mesh network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

b. Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

In an example embodiment, station-keeping functionality may involve balloons moving relative to the ground such that a desired population and/or general spacing may be maintained in a given area, even as the particular balloons that serve the area change. For example, balloons may move out of an area, while other balloons move into the same area. Accordingly, station-keeping functionality may focus on maintaining a desired topology, without necessarily requiring that certain balloons stay at certain locations.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

c. Control of Balloons in a Balloon Network

Figure 2:
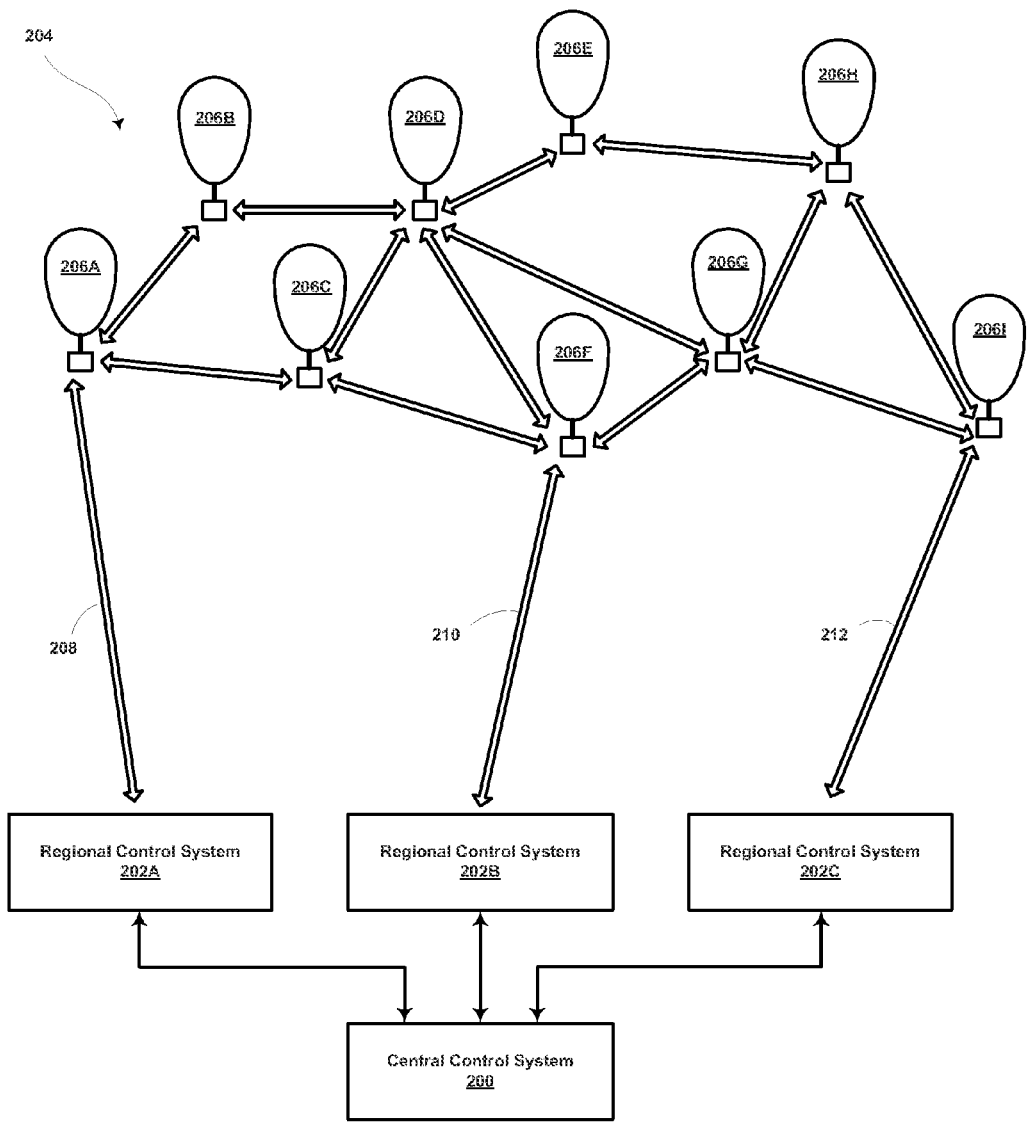
FIG. 2 is a simplified block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_i$, wherein $d_i$ is proportional to the distance to the second nearest neighbor balloon, for instance. Other algorithms for assigning force magnitudes for respective balloons in a mesh network are possible.

In another embodiment, a similar process could be carried out for each of the k balloons and each balloon could transmit its planned movement vector to its local neighbors.

Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

d. Example Balloon Configurations

Various types of balloon systems may be incorporated in an example balloon network. An example balloon network may include all superpressure balloons. Alternatively, the example balloon network may include only some superpressure balloons. One or more other types of balloons that vary in shape, size, design, and/or function may be possible as well. As noted above, an example embodiment may utilize high-altitude balloons, which could typically operate in an altitude range between 18 km and 25 km (the high-altitude balloons may operate in other altitude ranges as well).

Figure 3:
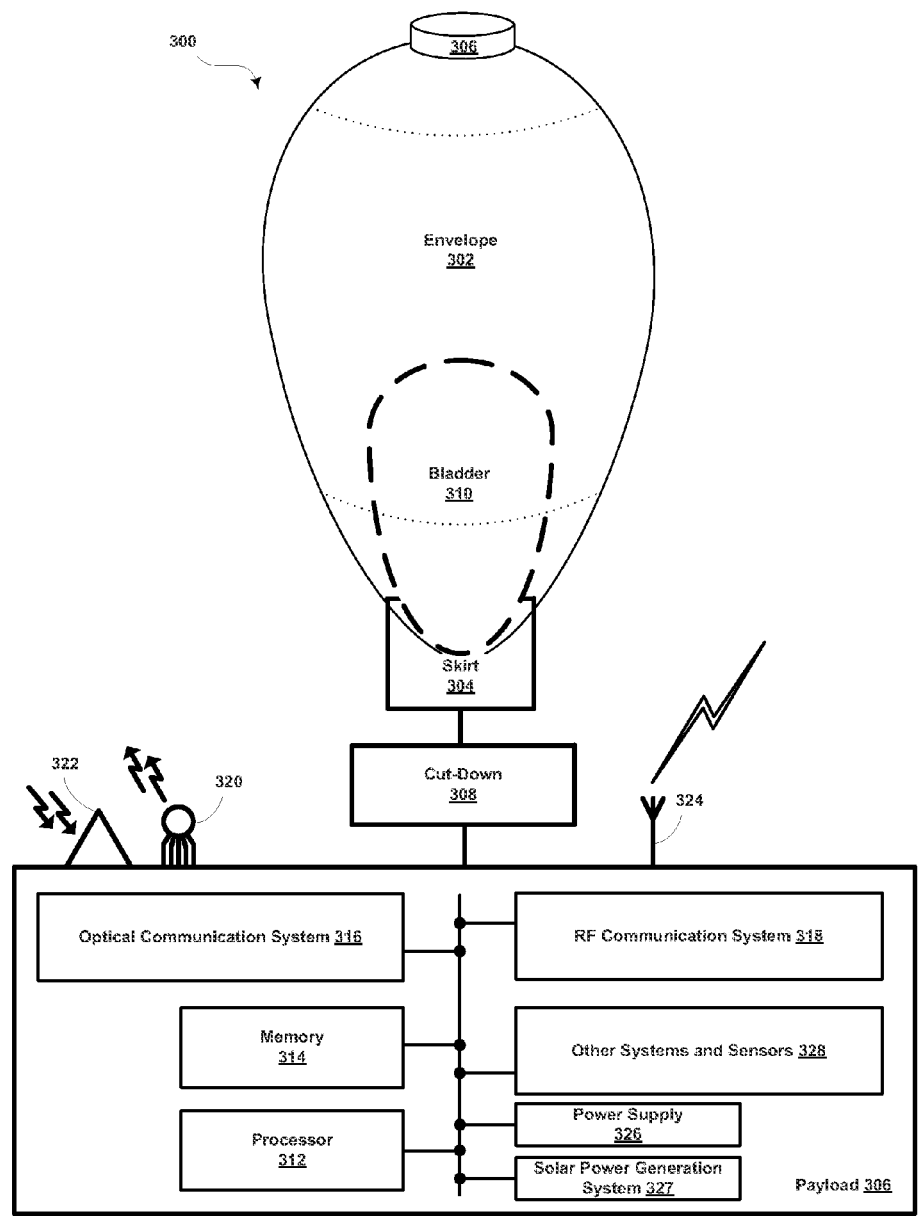
FIG. 3 is a simplified block diagram illustrating a high-altitude balloon, according to an example embodiment.

FIG. 3 shows a high-altitude balloon 300, according to an example embodiment. Balloon 300 includes an envelope 302, a skirt 304, a payload 306, and a cut-down system 308, which is attached between the balloon 302 and payload 306. The envelope 302 and skirt 304 may take various forms, which may be currently well-known or yet to be developed and may be made of any number of materials. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein. Thus, processor 312, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses). The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement stationkeeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

e. Example Tubular Balloon Configuration

Figure 4:
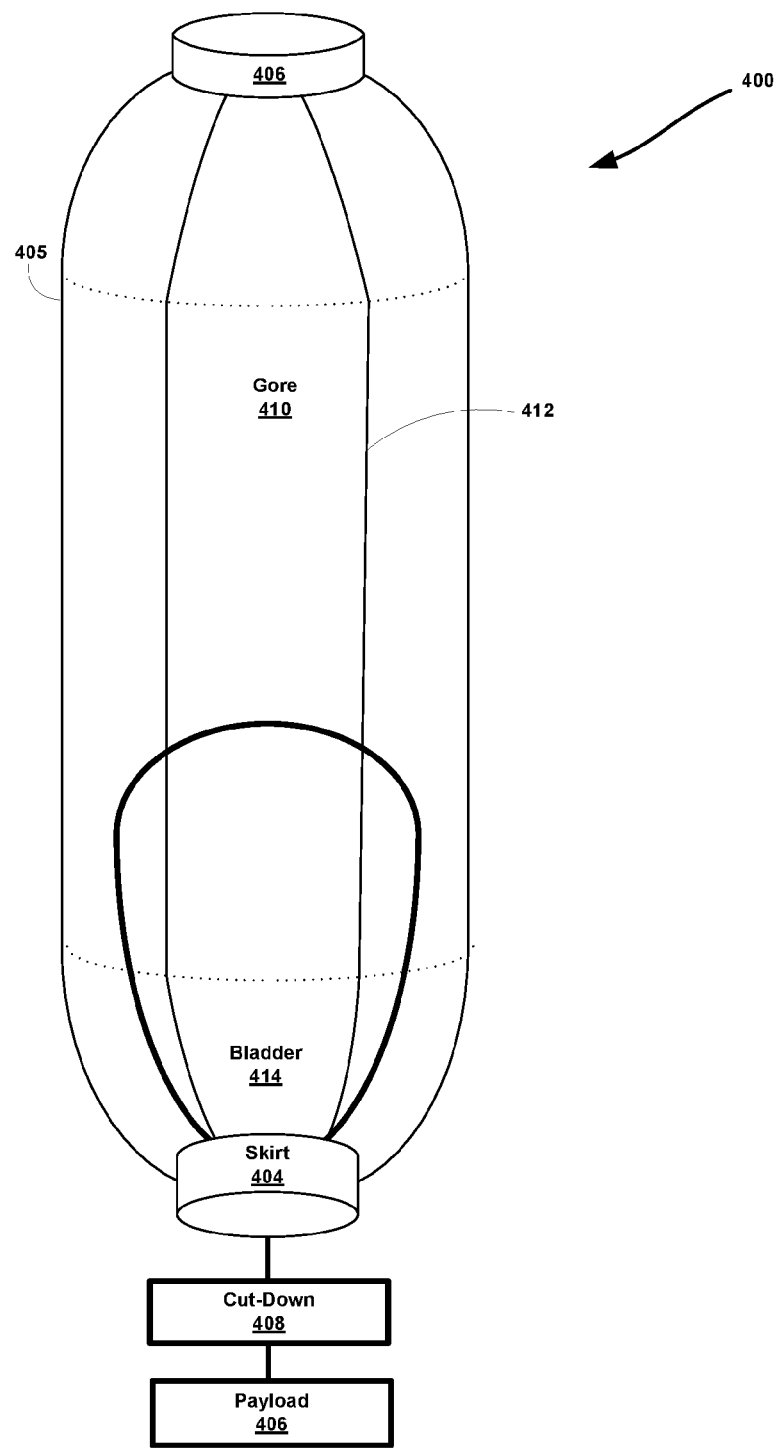
FIG. 4 is a simplified block diagram illustrating a high-altitude balloon, according to an example embodiment.

FIG. 4 is a perspective view of a superpressure balloon 400, which is generally tubular shaped, according to an example embodiment. As shown, balloon 400 may include an envelope 405, which is fabricated from a number of gores 410, each gore containing a number of gore edges 412. The balloon 400 may also include a top or bottom payload 406, a skirt 404, a cutdown system 408, and a bladder 414.

As illustrated in FIG. 4, the balloon 400 has a tubular shape. In one example, the tubular shaped envelope may take the form of a generally cylindrical balloon envelope. Other tubular shapes may be possible as well. The tubular shaped envelope may be the result of fabrication of the envelope 405 using a predetermined number of gores 410. Each gore may extend from the base of the envelope to the crown, and may be made of a number of smaller panels. The gores of a balloon may be fabricated from a two-dimensional material, such as those described below. The gores may then be connected to one another in order to create a three-dimensional, airtight envelope.

Specifically, the gores 410 may be connected, or sealed together, to provide structure and shape to the tubular balloon 400. In order to connect the gores 410, the gore edges 412 of each gore 410 may be connected to corresponding, adjacent gores edges 412 until the desired shape and size of the balloon is met.

Balloons may be produced in many different sizes or volumes. For example, a balloon 400 may be sized such that it is capable of carrying only the weight of its structure. In an alternative embodiment, the balloon 400 may be sized such that it is capable of carrying a 5-10 kg payload. Regardless, the number of different sizes and volumes is limitless.

The balloon 400 may have predetermined dimensions that may include a height, a width, a volume, and a circumference. Other dimensions may exist as well. The length of these dimensions may vary depending on the desired size of the balloon 400. In particular, the dimensions of the balloon 400 may vary based on the number of gores 410 and size of the gores 410 used to fabricate the balloon envelope 405. The number of gores 410 used to construct the balloon envelope 405 may vary. In one embodiment, the balloon envelope is constructed out of at least one gore 410. In an alternative embodiment, the balloon envelope is constructed out of two or more gores 410. Any number of gores 410 may be possible.

As one specific example, a balloon may have a height of 100 feet and a circumference of 25 feet, which may be the result of adjoining 5 gores that have a height of 100 feet and a width of 5 feet. Alternatively, a balloon may have a height of 100 feet and a circumference of 25 feet, but may be the result of adjoining 10 gores that have a height of 10 feet and a width of 2.5 feet. As such, the volume of each balloon may be substantially the same; while the number of gores and/or size of the gores may vary. Other examples may exist as well.

In order to maintain the behavior of the balloon 400 as a pressure cylinder, the ratio of the height to circumference of the balloon envelope 405 may vary. In one embodiment, a ratio of 2.5:1 length to circumference of the balloon envelope 405 is desired. Other ratios may exist as well, including a 3:1 height to circumference ratio or a 5:1 height to circumference ratio of the balloon envelope 405. Other height to circumference ratios may be possible as well. These ratios may be advantageous for various reasons. In particular, in order for the balloon envelope 405 to hold sufficient pressure for the tubular shape, a lengthened height relative to the circumference of the envelope is desired. Lengthened heights, however, may result in poorer surface area to volume ratio, just worsening the balloons performance in high altitudes. Therefore, the balloon envelope 405 may be constructed to hold a maximum amount of pressure relative to the ratio of the height to circumference of the balloon envelope.

As noted above, the tubular shape of the balloon 400 is the result of fabrication of the envelope 405 using a number of gores. The gores 410 may be constructed into any of a number of shapes. In an example embodiment, the gores 410 may be hexagonally shaped, as illustrated in FIG. 4. Other possible shapes include, but are not limited to: a square, a rectangle, a circle, an oval, a triangle, an octagon, a heptagon, a pentagon, or a crescent. Other shapes may be possible as well. The gores 410 may be of a certain height and width, which may vary depending on the desired volume of the balloon 400. In an example embodiment, the height of the gores may range from approximately 80 feet to 145 feet. Additionally, the width of the gores 410 may range from approximately 4 feet to 8 feet. Other sizes may be possible as well.

The gores 410 may be fabricated from any of a number of different materials. Due to the nature of the balloon 400, a lightweight, weather resistant, material may be used to manufacture the gores 410. In one embodiment, the gores 410 may be manufactured out of a stretched polyester film, otherwise known as biaxially-oriented polyethylene terephthalate (BoPET) or biaxially-oriented polyester (OPET). A common commercial brand of BoPET is known as Mylar®. BoPET, in particular, is a desirable material due to its gas barrier properties. Additionally, the material may provide structure to a balloon envelope 405. Further, the material may act as an electric insulator, retain chemical stability, and possess high tensile strength. The thickness, or "mils," of BoPET used for the construction of the balloon may vary. Other possible materials for gore fabrication include, but are not limited to, nylon, latex, or ethylene vinyl alcohol (EVOH).

In an example embodiment, the material chosen to fabricate the gores 410 may be treated with weather or UV resistant materials. Treatment of the materials may increase the longevity and durability of the material. In an example embodiment, the material chosen to fabricate the gores 410, such as Mylar, is corona treated. Corona treatment may be applied to one side of the material in order to protect the material from exposure to harsh conditions.

The gores 410 may each be made of the same or different materials. For example, in a hexagon-shaped balloon, three gores may be made of one material and three gores may be made of another material. Further, some or all of the gores may have an envelope 405 comprising layers of two or more materials laminated together.

Additional support may be included on the balloon through the addition of reinforcement tape. In particular, Mylar heat sealable tape may be used in conjunction with a fiberglass load tape to improve the balloon's ability to withstand the pressure experienced in the stratosphere.

f. Example Nested Envelope Balloon Configuration

Figure 5:
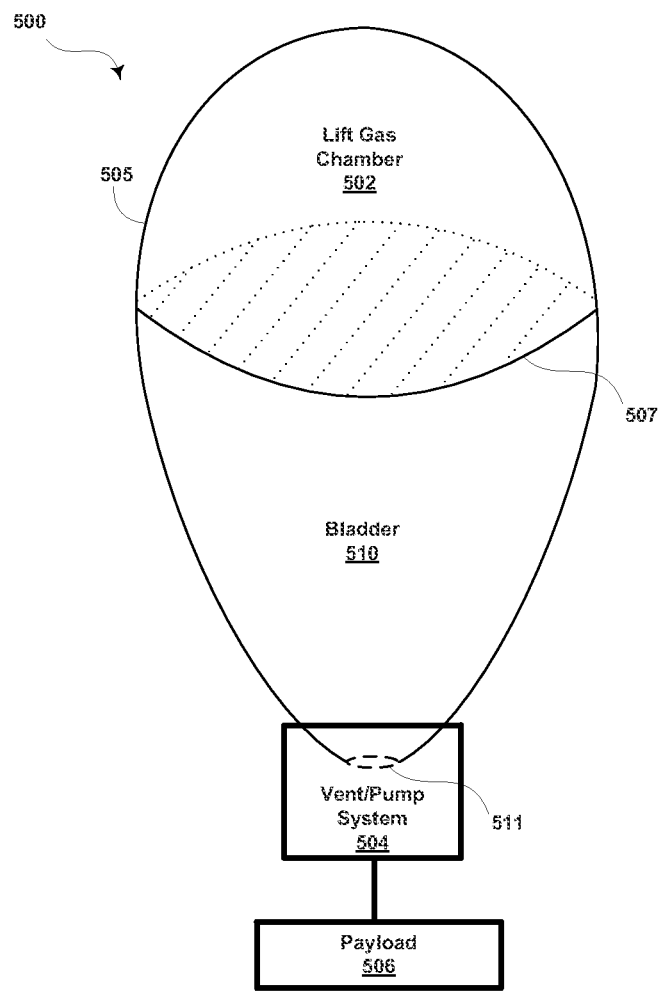
FIG. 5 is a simplified block diagram illustrating a high-altitude balloon, according to an example embodiment.

FIG. 5 is a perspective view of a superpressure balloon 500, having nested envelopes, according to an example embodiment. As shown, balloon 500 may include an envelope 505, a diaphragm 507, a payload 506, a pump 504 and a bladder 510.

In an example, envelope 505 is provided as a continuous unit, with diaphragm 507 sealably connected to the inner surface of the envelope 505 creating a sealed lift gas chamber 502 and a sealed bladder 510. Alternatively, envelope 505 may be formed in two parts, a first part defining at least a portion of the lift gas chamber 502 and a second part defining at least a portion of the bladder 510. In this example, the diaphragm may be integrally formed as a part of either the lift gas chamber 502 the lift gas chamber 502, or may be an independent unit that is sealably connected to both the lift gas chamber 502 and bladder 510 envelope portions. Bladder 510 may also be provided with a sealable opening 511 for pumping air into or out of the bladder.

In a further aspect, balloon 500 may be configured for altitude control. For instance, balloon 500 may include a variable buoyancy system, which is configured to change the altitude of the balloon 500 by adjusting the volume and/or density of the gas in the balloon 500. A variable buoyancy system may take various forms, and may generally be any system that can change the volume and/or density of gas in the lift gas chamber 502.

The lift gas chamber 502 and bladder 510 form a relatively fixed volume. The lift gas chamber 502 is filled with a lighter-than-air gas and is sealed before the balloon reaches altitude. The bladder 510 is coupled to a vent/pump system 504 so that it can be filled with pressurized air that functions as ballast. Ambient air is added or removed from the bladder 510 to adjust the mass of the balloon, while keeping the amount of lift gas in lift gas chamber 502 constant, thus controlling the balloon's altitude via adjustments to the amount of air in the bladder 510. Note that because the total balloon volume is relatively fixed, adding or removing air does not change the balloon's volume, but instead causes an increase or decrease in internal air pressure.

Further, in an example, the vent/pump system 504 may operate intermittently to regulate air pressure in the bladder 510. The vent/pump system 504 may also function as, or be used in combination with, a mechanism that passively seals the bladder 510 when the pump 504 is not operating, so that air does not escape from the bladder 510 when the vent/pump system 504 is turned off.

In an example embodiment, a variable buoyancy system may include a bladder 510 that sealably abuts lift gas chamber 502 as shown in FIG. 5. The bladder 510 could be an elastic or rigid chamber configured to hold liquid and/or gas. Diaphragm 507 may be provided as an elastic diaphragm separating lift gas chamber 502 from bladder 510. As described above, the buoyancy of the balloon 500 may therefore be adjusted by changing the density and/or volume of the gas in bladder 510. To change the density in bladder 510, balloon 500 may be configured with systems and/or mechanisms for heating and/or cooling the gas in bladder 510. Further, to change the volume, balloon 500 may include vent/pump system, 504 or other features for adding gas to and/or removing gas from bladder 510 via sealable opening 511. Additionally or alternatively, to change the volume of bladder 510, balloon 500 may include release valves or other features that are controllable to allow gas to escape from bladder 510.

In an example embodiment, the lift gas chamber 502 could be filled with helium, hydrogen or other lighter-than-air material. The lift gas chamber 502 could thus have an associated upward buoyancy force. In such an embodiment, air in the bladder 510 could be considered a ballast tank that may have an associated downward ballast force. In another example embodiment, the amount of air in the bladder 510 could be changed by pumping air (e.g., with an air compressor) into and out of the bladder 510. By adjusting the amount of air in the bladder 510, the ballast force may be controlled. In some embodiments, the ballast force may be used, in part, to counteract the buoyancy force and/or to provide altitude stability.

3. Balloon Envelope Materials and Construction

As described above, it may be desirable, in some situations to provide a balloon envelope constructed of more than one layer of material. However, considerations such as weight and cost of materials, in addition to considerations regarding the barrier properties and flexibility of the envelope, must be kept in mind. In order to maximize flight success, materials used to construct the balloon envelopes must be impermeable to gas, lightweight, and strong enough to provide structure to the balloon, yet flexible enough to allow the volume of the balloon to change with expansion or contraction of the gas contained within. Such a combination of properties is often difficult, specifically for balloons designed to travel into high altitudes, where temperature, light and atmospheric conditions may be extreme.

Moreover, achieving such properties with a single material—as balloon envelopes are traditionally constructed with a single layer of material—can prove even more difficult. Combining materials, each having their own unique properties that may be desirable for balloon construction and dynamics, may produce an envelope that provides benefits beyond those provided by each of the materials in isolation. The thickness and manner in which the materials are layered in the construction of the envelope may further provide a means for manipulating the properties of the envelope.

Figure 6:
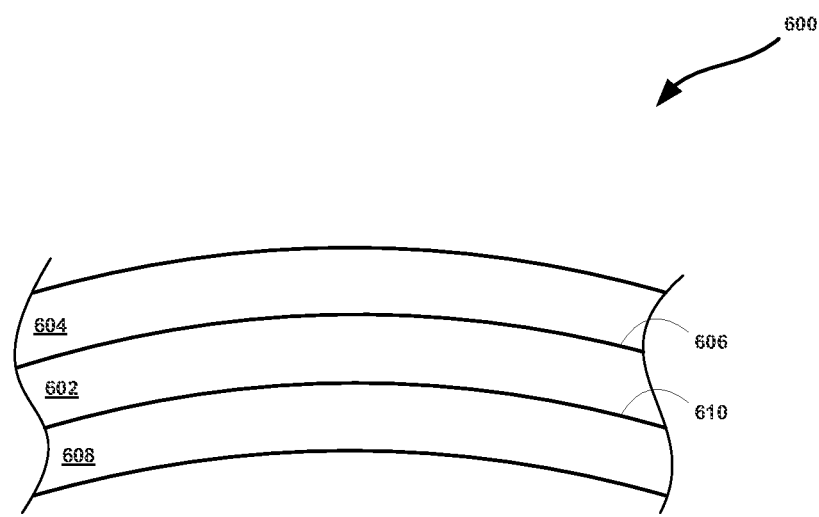
FIG. 6 is a cross-sectional view of a portion of a balloon envelope, according to an example embodiment.

FIG. 6 shows a partial cross section of a portion of an example balloon envelope 600, which may include a base layer 602. In one example, the base layer 602 may be made of EVOH and may have a thickness of between approximately 0.25 and 0.5 mm. EVOH is generally commercially available with mole % ethylene content of about 20-50%. In some examples, the base layer 602 of EVOH may have a mole % ethylene content within the range of approximately 35-48%. The particular ethylene content chosen may depend on the particular properties desired for the envelope as a whole, or on the properties of the material with which the EVOH layer may be combined. For example, a higher ethylene content may be chosen if a more flexible envelope is desired. Alternatively, a lower ethylene content may be chosen if greater gas impermeability is desired.

Generally, a balloon envelope must be capable of providing strength and structure to the balloon, while retaining a certain level of flexibility. This may be especially important to prevent tears or other material failures that may be experienced in a high-altitude application, especially when expansion and contraction of the envelope is necessary to position the balloon within the stratosphere. While EVOH is lightweight and provides excellent gas-barrier properties, the tensile strength of EVOH is relatively low.

An outer layer 604 of material may be bonded, by typical co-extrusion or co-lamination processes, to the outer surface 606 of the base layer 602. In one example, the outer layer 604 may be made of a second material that is different than the material comprising the base layer 602. The material of the outer layer 604 may have better gas-barrier properties than EVOH, may be stronger than EVOH and/or may be more flexible than EVOH. When bonded, the combination of the EVOH base layer 602 and the outer layer 604 may achieve characteristics that could not have been achieved with either one of the materials alone. For example, the combination of the EVOH layer and the layer of the second material may have better gas-barrier properties than the EVOH layer alone and the second material alone. In a further example, the combination of the EVOH layer and the layer of the second material may have a greater tensile strength than the EVOH layer alone and the layer of the second material alone. In yet a further example, the combination of the EVOH layer and the layer of the second material may be more flexible than the EVOH layer alone and the layer of the second material alone.

In some examples, the outer layer 604 will act as a structural layer to the envelope 600. In further examples, the outer layer 604 may provide elasticity to the envelope 600. The outer layer 604 may also act as a barrier that protects the EVOH base layer 602 from moisture. As EVOH is hygroscopic, its gas barrier properties may decrease in the presence of moisture or humidity.

In some examples, the outer layer 604 may be made from Mylar®, a common commercial brand of BoPET—biaxially-oriented polyethylene terephthalate—a type of stretched polyester film. Mylar has good gas barrier properties, chemical and dimensional stability, transparency, reflectivity, and electrical insulation. Mylar also has a high tensile strength, in some examples exceeding 28,000 psi. BoPET film, such as Mylar, can be metallized with thin films of evaporated aluminum, gold, or other metals, resulting in increased gas barrier properties and light reflectance. Further, Mylar can be co-laminated with a sealant layer, such as with Polyvinylidene chloride or amorphous Polyethylene terephthalate, for improved sealability. If the base layer 602 is made from EVOH and the outer layer 604 is made from Mylar, the mole % ethylene content of the EVOH may be chosen to have optimal barrier properties.

The outer layer 604 of the example envelope 600 may also be made of polyethylene, a thermoplastic polymer of ethylene. As described above, the mechanical properties of polyethylene depend significantly on variables such as the extent and type of branching, the crystal structure and the molecular weight. In some examples, a polyethylene film with approximately 0.922 g/cm$^3$ and a tensile strength exceeding 3200 psi, such as Dowlex 2021D may be used. The lower the crystallinity—which is visible as haze—of the polyethylene film, the greater the flexibility.

The example envelope 600 may, alternatively, have an inner layer 608 of material bonded to an inner surface 710 of the base layer 602, by conventional co-lamination or co-extrusion techniques. The material of the inner layer 608 may be different than the material of the base layer 602, and may be chosen with the same considerations as described above with respect to the outer layer 604. For example, the inner layer 608 may be made of a material that is stronger, more flexible and/or more gas-impermeable than the material of the base layer 602. In particular, the inner layer 608 may be made of Mylar or polyethylene.

Further, as shown in FIG. 6, the example balloon envelope 600 may be formed as a "sandwich" with a base layer 602 having an outer layer 604 bonded on its outer-facing surface 606 and an inner layer 608 bonded on its inner-facing surface 710. The material of the outer layer 604 may be the same as the material of the inner layer 608. In some cases, the material of the inner layer 608 may be different than the material of the base layer 602 and may also be different than the material of the outer layer 604. The material(s) of the inner layer 608 and/or outer layer 604 may be chosen and optimized to impart certain characteristics or properties on the envelope that may not have been achievable with any one of the materials alone.

The thickness of the outer 604 and inner 608 layers may vary, depending on the materials chosen and the properties desired of the layer(s). The outer 604 and inner 608 layers may have the same thickness. For example, the layer(s) may be between 1-3 mm thick. Alternatively, the outer 604 and inner 608 layers may have different thicknesses. In cases where the outer layer 604 is acting as a structural layer to the envelope, the thickness of the outer layer 604 may be provided with a greater thickness than the inner layer 608. Or, for example, if the outer 604 and inner 608 layers are made of polyethylene, given the material's stretch, the outer layer 604 may be thicker than the inner layer 608 because the outside curvature and strain of the envelope will rest more on the outer layer 604. If the outer layer 604 is acting as a moisture barrier for an EVOH base layer 602, then the thickness of the outer layer 604 may not be as significant.

The example envelope 604 may be constructed with the outer 604 and/or inner 608 layers covering substantially all or only portions of the envelope. The term "substantially all" of the envelope refers to a considerable amount of the envelope, or the greater part of the envelope, but should not be construed in a limiting fashion to mean the entirety of the envelope. For example, if the envelope 600 is provided with gores comprising a base layer 602 of one material, some of the gores may be provided with an outer 604 and/or and inner 608 layer of one or more different materials. Alternatively, the envelope may be provided with longitudinal bands of different layered material. An example envelope may also be constructed with a base layer 602 of one material having outer 604 and/or inner 608 layers of one or more different materials covering different hemispheres of the balloon. Other constructions and configurations are contemplated.

Other additives may also be co-extruded with the base 602, outer 604 and/or inner 608 layers, including certain UV blockers or IR absorbers, on all or parts of the envelope. Such additives have properties that may be useful in steering of a high-altitude balloon.

Example envelope 600 may be used to construct envelope 302, envelope 405 and envelope 505 described in relation to FIGS. 3, 4 and 5, respectively. In addition, structures internal to balloons 300, 400 and 500, such as bladders 310 and 410 and diaphragm 507, may also be constructed from example envelope 600.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A balloon envelope, comprising:
a plurality of gores, wherein adjacent gores of the plurality are connected along respective edges, and wherein at least some of the plurality of gores comprise:
a layer of ethylene vinyl alcohol (EVOH); and
a layer of an outer material directly bonded to and in direct contact with at least a portion of an outer-facing surface of the EVOH layer, wherein the outer material is not EVOH, and wherein the outer material has a greater tensile strength than EVOH.

2. The balloon envelope of claim 1, wherein the outer material is more flexible than EVOH.

3. The balloon envelope of claim 1, wherein the combination of the EVOH layer and the layer of the outer material is less gas-permeable than the EVOH layer alone and less gas-permeable than the layer of the outer material alone.

4. The balloon envelope of claim 1, wherein the outer material is a biaxially-oriented polyethylene terephthalate.

5. The balloon envelope of claim 1, wherein a layer of an inner material is bonded to at least a portion of an inner-facing surface of the EVOH layer.

6. The balloon envelope of claim 5, wherein the layer of the outer material is bonded to substantially all of the inner-facing surface of the EVOH layer.

7. The balloon envelope of claim 1, wherein the layer of the outer material is bonded to substantially all of the outer-facing surface of the EVOH layer.

8. The balloon envelope of claim 1, wherein the EVOH layer has a thickness between approximately 0.25 and 0.5 mm.

9. The balloon envelope of claim 1, wherein the layer of the outer material has a thickness between approximately 1 and 3 mm.

10. The balloon envelope of claim 1, wherein the layer of the outer material is the outer-most layer of the at least some of the plurality of gores.

11. The balloon envelope of claim 1, wherein a maximum thickness of the outer material is greater than a maximum thickness of the layer of EVOH.

12. The balloon envelope of claim 5, wherein the inner material is polyethylene and the outer material is biaxially-oriented polyethylene terephthalate.

13. A balloon envelope, comprising:
a plurality of gores, wherein adjacent gores of the plurality are connected along respective edges;
wherein a first subset of the plurality of gores comprises:
a layer of ethylene vinyl alcohol (EVOH) having an outer-facing surface and an inner-facing surface, the inner-facing surface of the EVOH layer being directly bonded to a first layer of polyethylene and the outer-facing surface of the EVOH layer being directly bonded to a second layer of polyethylene; and
wherein a second subset of the plurality of gores comprises:
a layer of EVOH having an outer-facing surface and an inner-facing surface, and wherein at least one of the outer-facing surface and the inner-facing surface are directly bonded to a layer of a material that is not polyethylene.

14. The balloon envelope of claim 13, wherein the EVOH layer has a thickness between approximately 0.25 and 0.5 mm.

15. The balloon envelope of claim 13, wherein the first layer of polyethylene has a thickness between approximately 1 and 3 mm.

16. The balloon envelope of claim 13, wherein the second layer of polyethylene has a thickness between approximately 1 and 3 mm.

17. The balloon envelope of claim 13, wherein the combination of the EVOH layer and the polyethylene layer is less gas-permeable than the EVOH layer alone and is less gas-permeable than the polyethylene layer alone.

* * * * *